(12) United States Patent
Huang

(10) Patent No.: US 9,341,741 B2
(45) Date of Patent: May 17, 2016

(54) ELECTRONIC DEVICE WITH TEMPERATURE AND HUMIDITY SENSOR AND METHOD FOR DETERMINING HUMIDITY VALUE

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Hua-Yu Huang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 357 days.

(21) Appl. No.: 14/092,939

(22) Filed: Nov. 28, 2013

(65) Prior Publication Data

US 2014/0366629 A1    Dec. 18, 2014

(30) Foreign Application Priority Data

Jun. 14, 2013   (CN) .......................... 2013 1 0236155O

(51) Int. Cl.
  *G01W 1/02*    (2006.01)
  *G01W 1/18*    (2006.01)

(52) U.S. Cl.
  CPC .. *G01W 1/02* (2013.01); *G01W 1/18* (2013.01)

(58) Field of Classification Search
  CPC ...................................................... G01W 1/02
  See application file for complete search history.

(56) References Cited

U.S. PATENT DOCUMENTS

| 6,535,817 | B1 * | 3/2003 | Krishnamurti | .......... | G01W 1/10 702/3 |
| 2004/0215483 | A1 * | 10/2004 | Fixman | .................. | G06Q 30/02 702/3 |
| 2012/0211907 | A1 * | 8/2012 | Panda | ....................... | F24F 6/14 261/128 |
| 2014/0365128 | A1 * | 12/2014 | Yoo | ......................... | G01W 1/10 702/3 |

* cited by examiner

*Primary Examiner* — Hezron E Williams
*Assistant Examiner* — David Z Huang
(74) *Attorney, Agent, or Firm* — Novak Druce Connolly Bove + Quigg LLP

(57) ABSTRACT

An electronic device includes a temperature and humidity sensor, a timing unit, and a storage unit storing a number of temperature values provided by weather forecast. Each of the temperature values provided by the weather forecast is associated with one time point. The electronic device obtains the temperature value and the humidity value sensed by the temperature and humidity sensor, obtains current time from the timing unit, associates the obtained temperature value and the humidity value with the current time, and stores the associated temperature value, humidity value, and the current time. The electronic device further compares each obtained temperature value with each temperature value provided by the weather forecast to find at which time point there is a match, searches in the storage unit to determine that each determined humidity value associated with one found time point is a humidity value with accuracy.

11 Claims, 4 Drawing Sheets

ELECTRONIC DEVICE WITH TEMPERATURE AND HUMIDITY SENSOR AND METHOD FOR DETERMINING HUMIDITY VALUE

BACKGROUND

1. Technical Field

The present disclosure relates to electronic devices, and particularly, to an electronic device having a temperature and humidity sensor and a method for determining humidity values.

2. Description of Related Art

Sensed humidity values acquired on conventional temperature and humidity sensors can easily be affected by dust, for example, especially in harsh environments. It is therefore difficult to use a temperature and humidity sensor to determine a humidity value with accuracy. Therefore, it is desired to provide an electronic device and a method for how to determine a humidity value with accuracy.

BRIEF DESCRIPTION OF THE DRAWINGS

Many aspects of the present disclosure should be better understood with reference to the following drawings. The units in the drawings are not necessarily drawn to scale, the emphasis instead being placed upon clearly illustrating the principles of the present disclosure. Moreover, in the drawings, like reference numerals designate corresponding portions throughout the several views.

DETAILED DESCRIPTION

Embodiments of the present disclosure are described in detail, with reference to the accompanying drawings.

Figure 1:
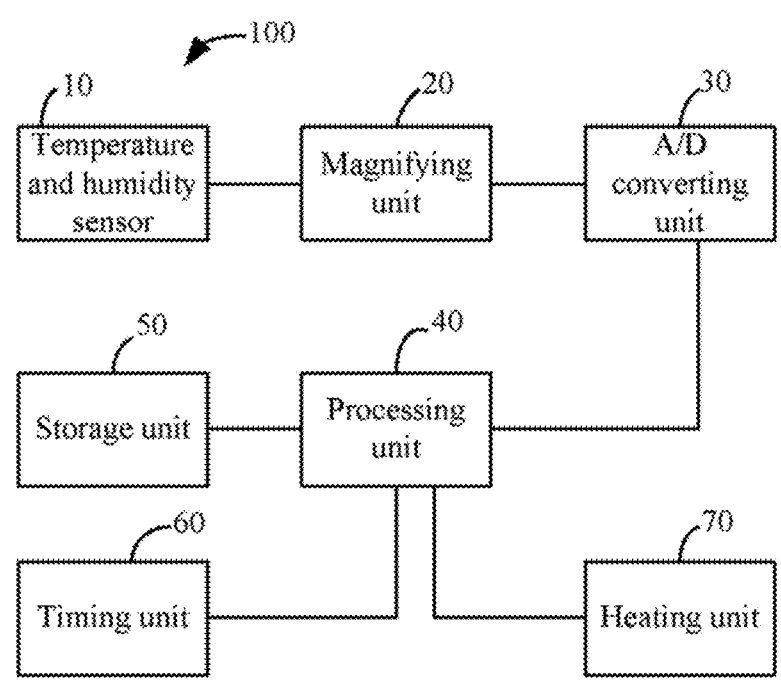
FIG. 1 is a block diagram of an electronic device with a temperature and humidity sensor, in accordance with an exemplary embodiment.

FIG. 1 shows an embodiment of an electronic device 100. The electronic device 100 includes a temperature and humidity sensor 10, a magnifying unit 20, an A/D converting unit 30, a processing unit 40, a storage unit 50, a timing unit 60, and a heating unit 70. The temperature and humidity sensor 10 outputs signals including a temperature value and a humidity value. The magnifying unit 20 magnifies the signals output from the temperature and humidity sensor 10 and outputs the magnified signals to the A/D converting unit 30. The A/D converting unit 30 converts the magnified signals into digital signals. The processing unit 40 obtains the temperature value and the humidity value according to the digital signals. The storage unit 50 stores a number of temperature values provided by weather forecast, and each temperature value is associated with one time point, for example, at 14:00 the temperature value is 26. In this embodiment, the storage unit 50 stores a first temperature-time curve to record a relationship between the temperature values and the time points provided by the weather forecast. The timing unit 60 provides current time.

Figure 2:
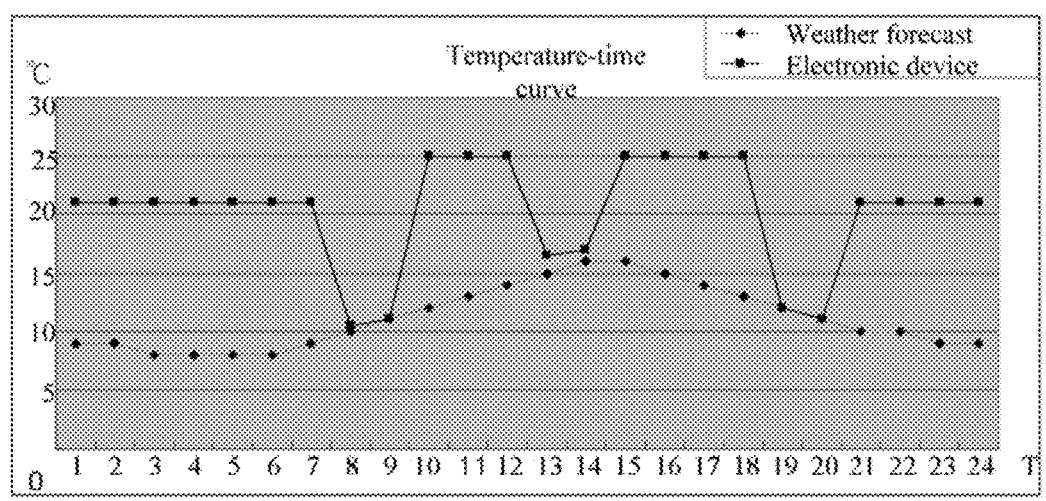
FIG. 2 is a schematic view showing a comparison between a temperature-time curve provided by the electronic device of FIG. 1 and a temperature-time curve provided by weather forecast.

In this embodiment, when the processing unit 40 obtains one temperature value and one humidity value sensed by the temperature and humidity sensor 10, the processing unit 40 obtains the current time from the timing unit 60. The processing unit 40 further associates the obtained temperature value and humidity value with the current time, and stores the associated temperature value, humidity value, and current time in the storage unit 50, for example, at 14:00, the temperature value is 26° C., and the humidity value is RH 30%. The processing unit 40 compares the obtained temperature values with the temperature values provided by weather forecast to find at which time point the obtained temperature value is the same as the temperature value provided by the weather forecast, and records the one or more found time points. In detail, the processing unit 40 obtains a second temperature-time curve to record a relationship between the obtained temperature values and the time points. The processing unit 40 finds at which time point the obtained temperature value is the same as the temperature value provided by the weather forecast by comparing the second temperature-time curve with the first temperature-time curve (see FIG. 2). In this embodiment, the processing unit 40 further searches in the storage unit 50 to determine that each humidity value associated with one of the found time points is a humidity value with accuracy, and displays each determined humidity value and associated time point. With such configuration, using the temperature values provided by the weather forecast to determine the one or more time points, and then determine that each humidity value associated with one of the found time points is a humidity value with accuracy, the accuracy of determining humidity values can be improved. That is, when one sensed temperature value is accurate, the humidity value sensed at the same time point is also accurate.

In this embodiment, the processing unit 40 further checks whether the temperature and humidity sensor 10 is normal. In this embodiment, when the processing unit 40 receives a trigger signal for checking the temperature and humidity sensor 10, the processing unit 40 obtains a first temperature value and a first humidity value sensed by the temperature and humidity sensor 10, and controls the heating unit 70 to work a preset time interval. The trigger signal can be generated by pressing a special button (not shown) of the electronic device 100. After the preset time interval, the processing unit 40 obtains a second temperature value and a second humidity value sensed by the temperature and humidity sensor 10. When the second temperature value is greater than the first temperature value, and the second humidity value is less than the first humidity value, the processing unit 40 obtains that the temperature and humidity sensor 10 is normal, and directs the heating unit 70 to stop working. After determining that the temperature and humidity sensor 10 is normal, the processing unit 40 obtains needed humidity values by comparing the temperature values sensed by the temperature and humidity sensor 10 with the temperature values provided by the weather forecast. The heating unit 70 may be a thermal resistor. The processing unit 40 switches the connection between the heating unit 70 and a power source (not shown) to control the work of the heating unit 70.

Figure 3:
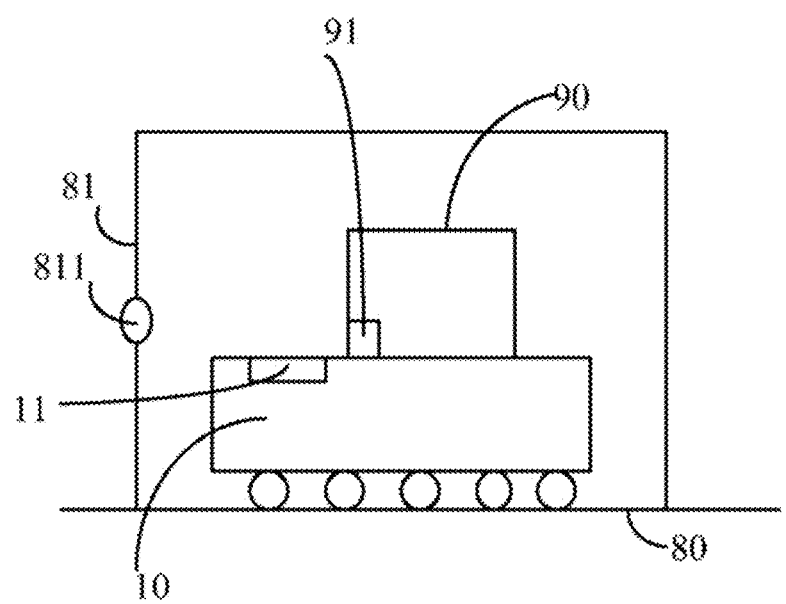
FIG. 3 is a schematic view showing how to mount a temperature and humidity sensor to the electronic device of FIG. 1, in accordance with an exemplary embodiment.

FIG. 3 shows that the electronic device 100 further includes a base 80, a microphone 90, and a dustproof cover 81. The temperature and humidity sensor 10 is arranged on the base 80 and below the microphone 90. A vent hole 11 of the temperature and humidity sensor 10 and a voice collection hole 91 of the microphone 90 are staggered. The temperature and humidity sensor 10 and the microphone 90 are arranged within the dustproof cover 81. The dustproof cover 81 includes an air vent 811 for exchanging air with external environment. With such configuration, other heating components of the electronic device 100 cannot affect the accuracy of temperature value and the humidity values sensed by the temperature and humidity sensor 10, and dust contamination can be avoided.

Figure 4:
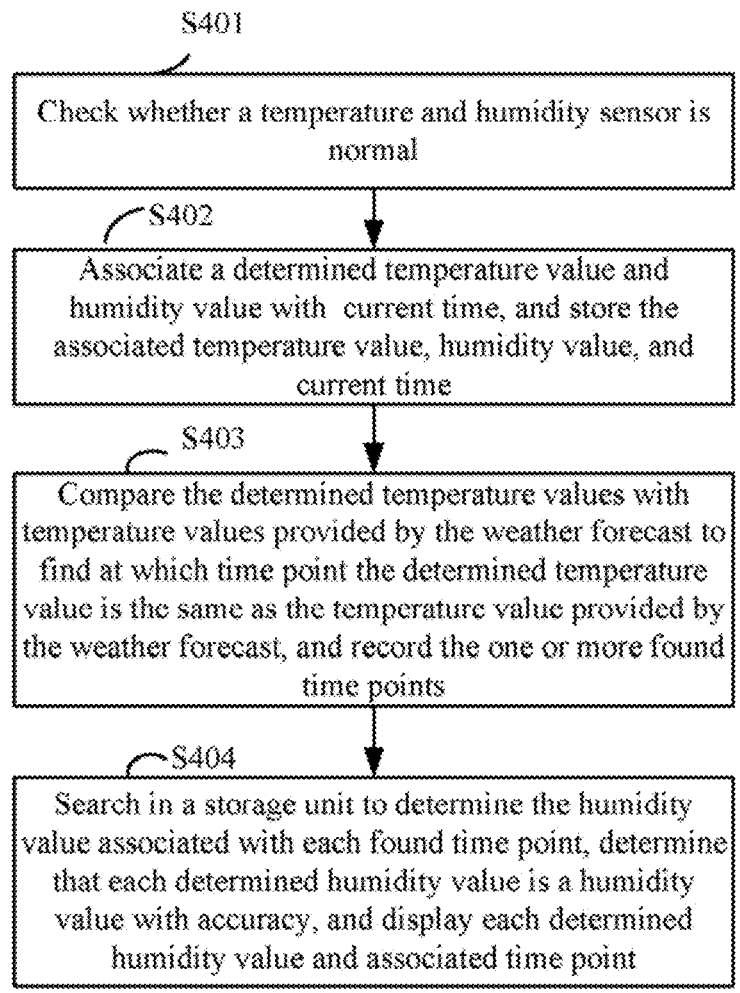
FIG. 4 is a flowchart of a method for displaying humidity values, in accordance with an exemplary embodiment.

FIG. 4 is a flowchart of a method for determining humidity values, in accordance with an exemplary embodiment.

In step S401, the processing unit 40 checks whether the temperature and humidity sensor 10 is normal.

In step S402, the processing unit 40 obtains one temperature value and one humidity value, obtains current time from the timing unit 60 when one temperature value and one humidity value is obtained, associates the obtained temperature value and humidity value with the current time, and stores the associated temperature value, humidity value, and current time in the storage unit 50.

In step S403, the processing unit 40 compares the obtained temperature values with the temperature values provided by the weather forecast to find at which time point the obtained temperature value is the same as the temperature value provided by the weather forecast, and records the one or more found time points.

In step S404, the processing unit 40 searches in the storage unit 50 according to the one or more found time points to determine the humidity value associated with each of the found time points, determines that each determined humidity value is a humidity value with accuracy, and displays each determined humidity value and associated time point.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. An electronic device comprising:
    a temperature and humidity sensor to sense a temperature value and a humidity value of the electronic device;
    a timing unit to provide current time;
    a storage unit storing a plurality of temperature values provided by a weather forecast, each of the temperature values provided by the weather forecast being associated with one time point; and
    a processing unit configured to obtain the temperature value and the humidity value sensed by the temperature and humidity sensor, obtain current time from the timing unit when determining the temperature value and the humidity value sensed by the temperature and humidity sensor, associate the obtained temperature value and the humidity value with the current time, and store the associated temperature value, humidity value, and the current time in the storage unit, the processing unit being further configured to compare each obtained temperature value with each temperature value provided by the weather forecast to find at which time point the obtained temperature value is the same as the temperature value provided by the weather forecast, record the one or more found time points, search in the storage unit according to each of the one or more found time points to determine the humidity value associated with each of the one or more found time points, and determine that each determined humidity value is a humidity value with accuracy.

2. The electronic device as described in claim 1, wherein the processing unit is further configured to display each determined humidity value and associated time point.

3. The electronic device as described in claim 1, wherein the storage unit stores a first temperature-time curve to record a relationship between the temperature values and the time points provided by the weather forecast, and the processing unit is configured to determine a second temperature-time curve to record a relationship between the obtained temperature values and the time points, and find at which time point the obtained temperature value is the same as the temperature value provided by the weather forecast by comparing the second temperature-time curve with the first temperature-curve.

4. The electronic device as described in claim 1, further comprising a magnifying unit and an A/D converting unit, wherein the temperature and humidity sensor is configured to output signals to the magnifying unit, the magnifying unit is configured to magnify the signals from the temperature and humidity sensor and output the magnified signals to the A/D converting unit, the A/D converting unit is configured to convert the magnified signals into digital signals, and the processing unit is configured to determine one temperature value and one humidity value according to the digital signals.

5. The electronic device as described in claim 1, further comprising a heating unit, wherein the processing unit is further configured to obtain a first temperature value and a humidity value sensed by the temperature and humidity sensor upon receiving a trigger signal for checking the temperature and humidity sensor, control the heating unit to work a preset time interval, and determine a second temperature value and a second humidity value sensed by the temperature and humidity sensor upon the preset time interval elapses, the processing unit is further configured to determine that the temperature and humidity sensor is normal when the second temperature value is greater than the first temperature value, and the second humidity value is less than the first humidity value, and direct the heating unit to stop working.

6. The electronic device as described in claim 1, further comprising a base, and a microphone, wherein the temperature and humidity sensor is arranged on the base and below the microphone, a vent hole of the temperature and humidity sensor and a voice collection hole of the microphone are staggered.

7. The electronic device as described in claim 6, further comprising a dustproof cover, wherein the temperature and humidity sensor and the microphone are arranged within the dustproof cover.

8. A method for determining humidity values applied in an electronic device, the electronic device comprising a temperature and humidity sensor to sense a temperature value and a humidity value of the electronic device, a timing unit to provide current time, and a storage unit storing a plurality of temperature values provided by a weather forecast, each of the temperature values provided by the weather forecast being associated with one time point, the method comprising:
    obtaining the temperature value and the humidity value sensed by the temperature and humidity sensor;
    obtaining current time from the timing unit when determining the temperature value and the humidity value sensed by the temperature and humidity sensor;
    associating the obtained temperature value and the humidity value with the current time, and storing the associated temperature value, humidity value, and the current time in the storage unit;
    comparing each obtained temperature value with each temperature value provided by the weather forecast to find at which time point the obtained temperature value is the same as the temperature value provided by the weather forecast, and recording the one or more found time points; and searching in the storage unit according to each of the one or more found time points to determine the humidity value associated with each of the one or more found time points, and determining that each determined humidity value is a humidity value with accuracy.

9. The method as described in claim 8, further comprising:
displaying each determined humidity value and associated time point.

10. The method as described in claim 8, wherein the step of comparing each obtained temperature value with each temperature value provided by the weather forecast to find at which time point the obtained temperature value is the same as the temperature value provided by the weather forecast comprising:
determining a second temperature-time curve to record a relationship between the obtained temperature values and the time points, and find at which time point the obtained temperature value is the same as the temperature value provided by the weather forecast by comparing the second temperature-time curve with a first temperature-curve recording a relationship between the temperature values and the time points provided by the weather forecast.

11. The method as described in claim 8, further comprising:
obtaining a first temperature value and a first humidity value sensed by the temperature and humidity sensor upon receiving a trigger signal for checking the temperature and humidity sensor;
controlling a heating unit to work a preset time interval;
determining a second temperature value and a second humidity value sensed by the temperature and humidity sensor upon the preset time interval elapses; and
determining that the temperature and humidity sensor is normal when the second temperature value is greater than the first temperature value, and the second humidity value is less than the first humidity value, and directing the heating unit to stop working.

* * * * *